United States Patent
Rose et al.

(10) Patent No.: US 7,957,325 B2
(45) Date of Patent: Jun. 7, 2011

(54) METHOD AND NETWORK ELEMENT CONFIGURED FOR LIMITING THE NUMBER VIRTUAL LOCAL AREA NETWORKS CREATABLE BY GVRP

(75) Inventors: Laurence Rose, Oak Park, CA (US); Roberto Henrique J. Da Silva, Oak Park, CA (US)

(73) Assignee: Alcatel Lucent, Paris (FR)

( * ) Notice: Subject to any disclaimer, the term of this patent is extended or adjusted under 35 U.S.C. 154(b) by 438 days.

(21) Appl. No.: 11/534,776

(22) Filed: Sep. 25, 2006

(65) Prior Publication Data
US 2007/0211737 A1  Sep. 13, 2007

Related U.S. Application Data

(60) Provisional application No. 60/781,911, filed on Mar. 13, 2006.

(51) Int. Cl.
*H04L 12/28* (2006.01)
(52) U.S. Cl. .......................... 370/255; 370/392; 709/242

(58) Field of Classification Search ............. 370/395.53, 370/401, 420, 254–258, 389–392
See application file for complete search history.

(56) References Cited

U.S. PATENT DOCUMENTS

| 7,594,028 B1 * | 9/2009 | Jacobs et al. ................. 709/242 |
| 2005/0152289 A1 * | 7/2005 | Nagata et al. ................. 370/256 |
| 2005/0180391 A1 * | 8/2005 | Shimada ........................ 370/351 |
| 2006/0187853 A1 * | 8/2006 | Mititelu ......................... 370/254 |
| 2007/0036165 A1 * | 2/2007 | Rose et al. ..................... 370/401 |

FOREIGN PATENT DOCUMENTS

EP  01509013 A * 2/2005

* cited by examiner

*Primary Examiner* — Ayaz R Sheikh
*Assistant Examiner* — Mounir Moutaouakil
(74) *Attorney, Agent, or Firm* — Galasso & Assoc. L.P.

(57) ABSTRACT

A Layer 2 device configured for providing at least one of bridging and switching functionality in a local area network comprising computer readable instructions for providing GVRP functionality and computer-readable instructions for limiting the number of dynamic VLANs that the GVRP functionality creates on a Layer 2 device of a local area network and on all ports of a data plane card of the Layer 2 device.

15 Claims, 2 Drawing Sheets

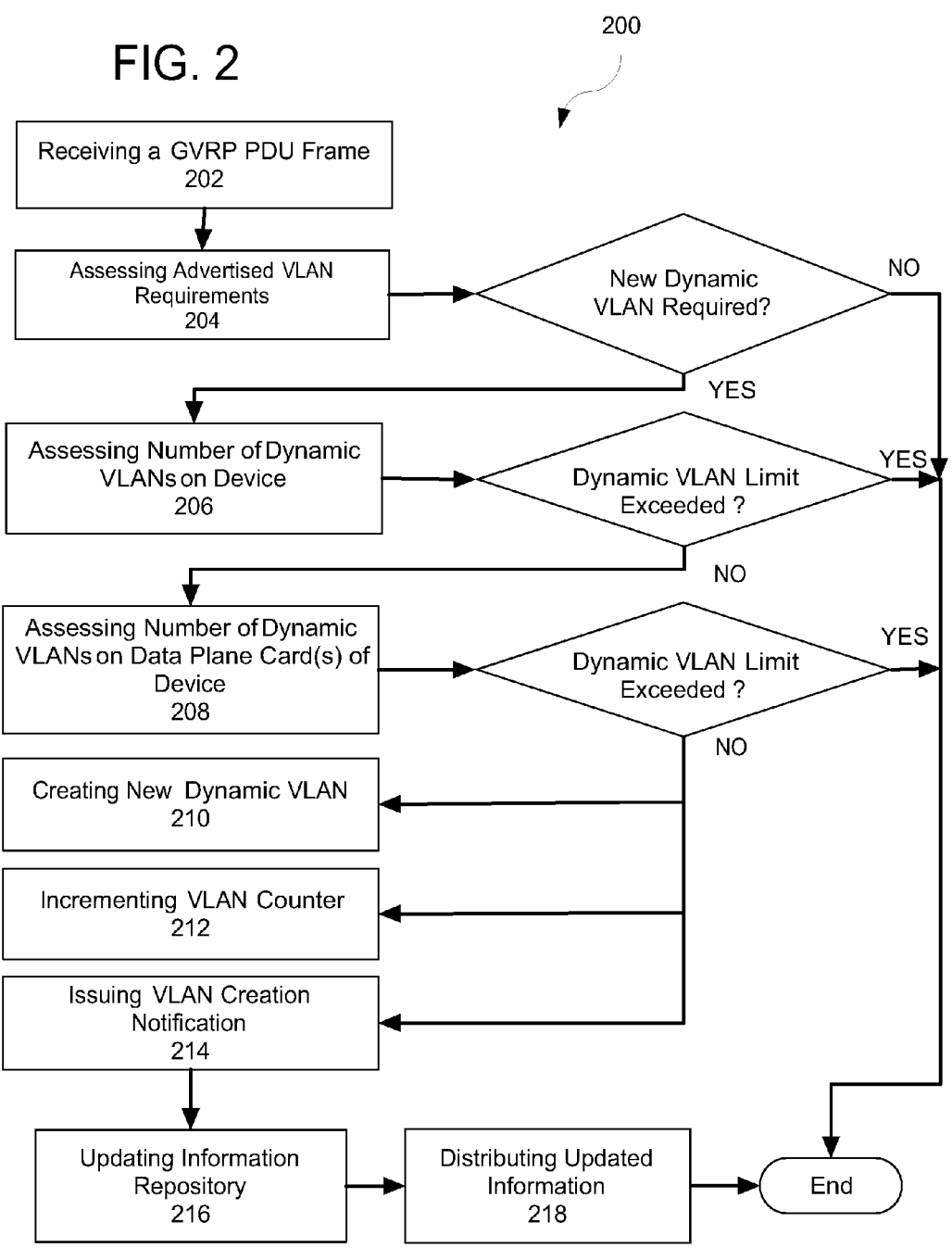

METHOD AND NETWORK ELEMENT CONFIGURED FOR LIMITING THE NUMBER VIRTUAL LOCAL AREA NETWORKS CREATABLE BY GVRP

CROSS REFERENCE TO RELATED APPLICATIONS

This patent application claims priority to co-pending U.S. Provisional Patent Application having Ser. No. 60/781,911 filed Mar. 13, 2006 entitled "Limiting the Number of VLANs That Can Be Created by GVRP on a Chassis or Stack Based Bridging Device with Distributed or Centralized Software Architectures", having a common applicant herewith and being incorporated herein in its entirety by reference.

FIELD OF THE DISCLOSURE

The disclosures made herein relate generally to using managing creation and persistence of Virtual Local Area Networks (VLANs) using GARP (Generic Attribute Registration Protocol) VLAN Registration Protocol (GVRP) and, more particularly, to managing the number of VLANs created on a Layer 2 device using GVRP.

BACKGROUND

GARP (Generic Attribute Registration Protocol) Virtual Local Area Network (VLAN) Registration Protocol is commonly referred to as GVRP. GVRP is an Open System Interconnection (OSI) Layer 2 network protocol that provides for automatic configuration of Layer 2 devices (referred to herein as bridges) in a VLAN. More specifically, GVRP defines a GARP application that provides for VLAN pruning and dynamic VLAN creation in accordance with IEEE Std. 802.1Q, 2003 Edition, Virtual Bridged Local Area Networks.

A bridge that runs GVRP has the potential for serious problems should a malicious host connected to the bridge produce a high volume of malicious GVRP frames. Each GVRP frame is able to convey advertisements for a large number of VLANs. As a result, the bridge would have to process the registration of thousands of VLANs in a very short timeframe in a repeated manner. This type of malicious activity may cause high CPU load and exhaustion of system resources, which may potentially overwhelm the bridge.

Bridge devices that are 802.1Q-compatible typically support VLAN identifiers in the range from 1 to 4096. This means that in the worst-case scenario, a bridge can create up to 4K VLANs. VLANs can be created manually upon management commands control or dynamically via mechanisms such as GVRP. The processing of GVRP frames (i.e., GVRP Protocol Data Units (PDUs)) involves the mapping of the VLANs advertised on GVRP frames onto the receiving ports, creation of these VLANs on the bridging device and propagation of the GVRP frames within the GIP (GARP Information Propagation) context, which corresponds to the active Spanning Tree topology. Based on the standard definition of the frame format and length as well as the maximum allowed length of Ethernet frames, the maximum number of VLANs that can be advertised on a single Ethernet frame is about 373. This means that in order to advertise VLANs on the range from 1 to 4096, multiple GVRP frames need to be sent in a row to convey this large number of attributes. That said, nothing prevents an attacker from being able to advertise such a number of VLANs.

The processing of GVRP frames may either lead to the creation of VLANs (if the advertised VLANs do not yet exist on the bridge) or simply the mapping of ports to existing VLANs. In either case, the data plane cards where the GVRP frame is received are responsible for performing all sanity and configuration checks. Nevertheless, the data plane cards would need to convey the demand for dynamically creating these VLANs or mapping VLANs onto ports to a central control plane card. That centralized card, in turn, would create or map the requested VLANs and advertise the new status to all interested applications on the bridge. The software operations involved in such creation and/or mapping consume CPU power, inter-process communication infrastructure resources, memory as well as other operating system resources. Accordingly, the processing of many GVRP frames may contribute to a generalized increase in system resources usage. Depending on the implementation, the system in which such VLANS are created may not even have enough CPU capacity or resources to handle this amount of processing in that short time. Furthermore, this may starve some more crucial applications because of an intense GVRP activity.

Most of the relatively low cost Layer 2 devices, especially the ones targeting Enterprise markets, may be brought down due to issues related to high CPU load, high memory consumption and exhaustion of buffers when a large number of dynamic VLAN registrations or de-registrations occur in a bulk. Due to this type of problem, vendors tend to generally caution the user to not create more than a reasonable number of VLANs in the technical literacy provided with bridging equipment. Such issues are likely to happen in specific configurations where GVRP registration is enabled on edge ports (i.e. access ports). Basically, the worse situation would occur if any end-user equipment connected to an edge port would be able to advertise any VLAN across the entire topology. For example, each time the end-user equipment would get switched-on or while running a deliberate malicious script, this equipment would start sending multiple GVRP frames to the first hop bridge that, in turn, may perform standard GVRP processing, thus propagating the multiple GVRP frames.

Although some vendors suggest that a reasonable procedure for precluding such propagation is to disable GVRP on such edge or access ports, the standard foresees the possibility of having GVRP-aware hosts connected to edge ports. Therefore, a desired implementation must be flexible enough to support such kind of configuration. A problem that arises as side effect of this conventional approach for limiting the creation of VLANs at a chassis level of a layer 2 device is that the first data plane card to receive and process GVRP frames may claim all the VLANs defined by a configured system-wide limit.

Therefore, facilitating creation of VLANs using GVRP in a manner that limits the number of VLANs that can be created on a Layer 2 network element and that overcomes drawbacks associated with conventional approaches for creating VLANs using GVRP would be advantageous, desirable and useful.

SUMMARY OF THE DISCLOSURE

Embodiments of the present invention protect a Layer 2 device (e.g., a bridging device) against malicious hosts, connected directly to a bridging device, in case a huge number of malicious GVRP frames are generated in a short time frame that advertising large quantities of VLANs. More specifically, embodiments of the present invention provide a means for precluding malicious GVRP frames from causing high CPU load and exhausting system resources on the bridging device. Additionally, embodiments of the present invention provide load-sharing flexibility to the user as far as defining how dynamic VLANs can be distributed across the data plane cards of a bridge. Embodiment of the present invention provide such functionality in a simple manner that does not require modifications on any of the GVRP standard state machines or behaviors and that has little to no adverse impact on convergence time. Accordingly, embodiments of the present invention advantageously overcome one or more shortcomings associated with conventional approaches for addressing large quantities of malicious GVRP frames being generated that advertise a large number of VLANs.

In one embodiment of the present invention, a Layer 2 device configured for providing at least one of bridging and switching functionality in a local area network comprising computer readable instructions for providing GVRP functionality and computer-readable instructions for limiting the number of dynamic VLANs that the GVRP functionality creates on a Layer 2 device of a local area network and on all ports of a data plane card of the Layer 2 device.

In another embodiment of the present invention, a method for facilitating VLAN creation functionality comprises a plurality of operations. An operation is performed for receiving a GVRP PDU frame on a data plane card application of a layer 2 device and an operation is performed for determining that a dynamic VLAN advertised on the GVRP PDU frame requires creation of a new dynamic VLAN. An operation is performed for determining whether a prescribed maximum number of dynamic VLANs permitted on the Layer 2 device will be exceeded by creation of the new dynamic VLAN and an operation is performed for determining whether a prescribed maximum number of dynamic VLANs permitted on all ports of a data plane card of the Layer 2 device will be exceeded by creation of the new dynamic VLAN. In response to determining that creation of the new dynamic VLAN will not cause the maximum number of dynamic VLANs permitted on the network system or on the data plane card to be exceeded, an operation is performed for creating the new dynamic VLAN.

In another embodiment of the present invention, a local area network includes a Layer 2 device. The Layer 2 device comprises a data processing device, instructions processible by the data processing device and an apparatus from which the instructions are accessible by the data processing device. The instructions are configured for enabling the data processing device to facilitate providing GVRP functionality and limiting the number of dynamic VLANs that the GVRP functionality creates on the Layer 2 device and on all ports of a data plane card of the Layer 2 device.

Turning now to specific aspects of the present invention, in at least one embodiment, limiting the number of dynamic VLANs includes determining that a dynamic VLAN advertised on a GVRP PDU frame requires creation of a new dynamic VLAN, determining whether a prescribed maximum number of dynamic VLANs permitted on a Layer 2 device of a local area network will be exceeded by creation of the new dynamic VLAN, and determining whether a prescribed maximum number of dynamic VLANs permitted on all ports of any data plane card of the Layer 2 device will be exceeded by creation of the new dynamic VLAN.

In at least one embodiment of the present invention, functionality is provided for precluding creation of the new dynamic VLAN in response to determining that creation of the new dynamic VLAN will cause the maximum number of dynamic VLANs permitted on a Layer 2 device or on any data plane card of the Layer 2 device to be exceeded.

In at least one embodiment of the present invention, providing GVRP functionality includes receiving the GVRP PDU frame on a data plane card application of the Layer 2 device.

In at least one embodiment of the present invention, functionality is provided for incrementing a VLAN counter by a single counter unit in response to creating the new dynamic VLAN.

In at least one embodiment of the present invention, functionality is provided for sending a VLAN creation notification to a control plane card of the Layer 2 device, updating an information repository of the control plane card to reflect new information corresponding to the new dynamic VLAN, and distributing at least a portion of the new information to at least one other data plane card of the Layer 2 device and to at least one requesting application of the control plane card.

These and other objects, embodiments, advantages and/or distinctions of the present invention will become readily apparent upon further review of the following specification, associated drawings and appended claims.

BRIEF DESCRIPTION OF THE DRAWINGS

FIG. 2 shows an embodiment of a method for facilitating VLAN creation functionality in accordance with the present invention.

DETAILED DESCRIPTION OF THE DRAWING FIGURES

Figure 1:
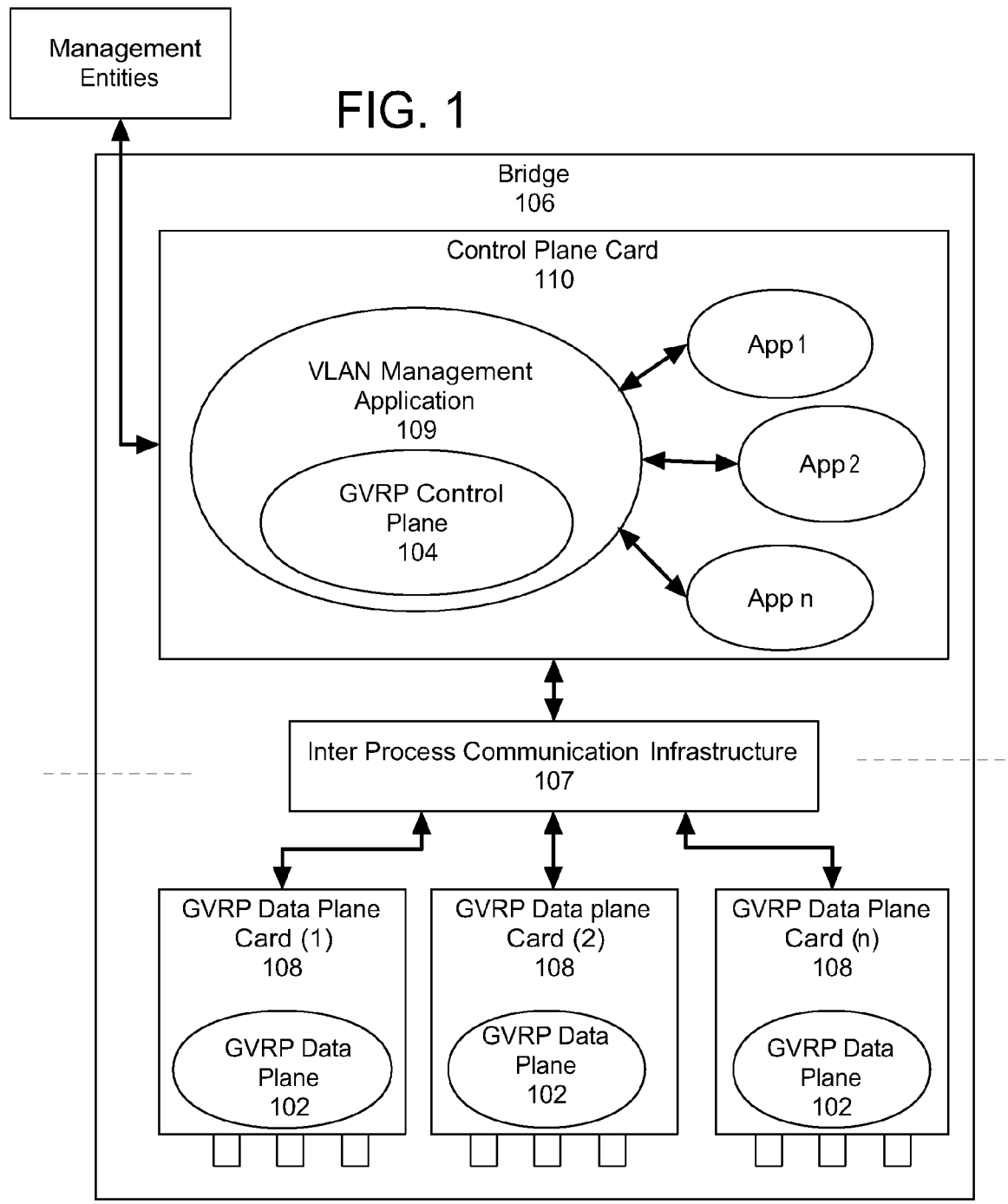
FIG. 1 shows an embodiment of a Layer 2 device of a LAN having GVRP functionality implemented as a fully distributed application.

The disclosures made herein rely on the following differentiation between a static VLAN and a dynamic VLAN. A dynamic VLAN is defined herein as never being created upon management command but by a GVRP application and/or some types of proprietary applications. When a bridge is rebooted, all dynamic VLANs disappear from the VLAN database and may be re-created dynamically by GVRP. Conversely, a static VLAN is created by the user upon management command. GVRP cannot create any static VLAN and a static VLAN remains created after a bridge reboots. In other words, static VLANs are part of the persistent configuration of a bridge.

Embodiments of the present invention solve two problems that may give rise to adverse situations on a bridge of a LAN (Local Area Network). The first problem is that of a bridge that runs GVRP having the potential for serious problems should a malicious host connected to the bridge produce a high volume of malicious GVRP frames. Because each GVRP frame is able to convey advertisements for a large number of dynamic VLANs, the bridge would potentially have to process the registration of thousands of dynamic VLANs in a very short timeframe in a repeated manner, which may cause high CPU load and exhaustion of system resources and potentially overwhelm the bridge. The second problem arises as a side effect of limiting the creation of dynamic VLANs at a chassis level. In doing so, a first data plane card of a bridge to receive and process GVRP frames may claim all the dynamic VLANs defined by a configured system-wide limit. As discussed below, embodiments of the present invention limit the number of dynamic VLANs that can be created on a bridge and on any one data plane card of the bridge, thus enhancing load sharing, system flexibility and system security functionalities.

To this end, embodiments of the present invention provide a configurable mechanism aimed at limiting the number of dynamic VLANs that can be created on a chassis, virtual chassis stack-based or stand-alone bridging device as result of GVRP protocol processing. This per-bridge mechanism addresses security concerns inherent to the GVRP protocol operation while meeting requirements such as minimal user configuration, no impact to convergence and no modification to any standard behavior associated to GVRP. Embodiments of the present invention further provide a configurable mechanism aimed at limiting the number of dynamic VLANs that can be created on each data plane card part of a chassis, virtual chassis stack-based or stand-alone bridging device as result of GVRP protocol processing. This per-card mechanism provides flexibility to insure load sharing for the creation and configuration of VLANs among the data plane cards as well as preventing one of the data plane cards on the bridge to monopolize the creation of dynamic VLANs upon GVRP request.

Accordingly, by adding intelligence to the data plane of GVRP application in order to allow it to enforce a maximum number of dynamic VLANs (i.e., a threshold or limit) that can be created on a chassis-based or stackable based bridge at any given time, an application in accordance with the present invention addresses security concerns related to a possible attack via a massive transmission of GVRP frames. Similarly, the present invention also provides for a per-data plane card limit that follows the same principles as that for the bridge itself. These threshold values must be configurable by the user and default values may be provided based on the capacity and placement of a respective piece of equipment (e.g., a bridge) in the network topology. If these user-defined thresholds are reached, then the creation of any subsequent dynamic VLAN via GVRP is not accepted until the total number of VLANs created by GVRP on the system or per data plane card drops below the thresholds. The check against the configured thresholds, as well as all processing related to the GVRP state machines and configuration verification, is performed on the data plane cards in a distributed fashion. Nevertheless, all the data plane cards as well as the active control plane card will always maintain the complete view of the VLANs and corresponding VLAN-Port associations of the entire bridging device. This allows for a simplified implementation, while still meeting the requirements of enhanced security for most of the real world scenarios. Preferably, but not necessarily, the present invention is implemented and its goals are achieved without imposing any modification to the internal GVRP state machine behavior.

Prior to further discussion on inventive aspects of the present invention, a brief overview of related aspects of GVRP functionality is provided. With GVRP, bridges running GVRP can exchange VLAN configuration information with other GVRP bridges, prune unnecessary broadcast and unknown unicast traffic, and dynamically create and manage VLANs on bridges. When a port is mapped onto a dynamic VLAN by mean of GVRP, the port may become an 802.1Q trunk port, or if it is already one, a newly tagged VLAN is configured onto that port. GVRP prunes VLANs from trunk links so that only active VLANs will be sent across trunk ports. GVRP expects to hear VLAN advertisements (e.g., join messages) from the neighboring bridges before it will add a VLAN to the trunk. GVRP provides various ways to configure and control the dynamic creation of VLANS and how to add or prune them on ports. Additionally, GVRP makes use of the GARP Information Propagation (GIP) context, which is the set of ports belonging to the active topology for a given Spanning Tree instance. For any VLAN being mapped to a given Spanning Tree instance, the GIP context defines the set of ports where to propagate advertisements about a given VLAN by GVRP mean.

FIG. 1 shows an embodiment of a GVRP application implemented on a chassis-based bridge or stack-based bridge in accordance with the present invention. The GVRP application is implemented as a fully distributed application both in a data plane 102 (i.e., GVRP data plane) and in a control plane 104 (i.e., GVRP control plane) of a bridge 106. An inter process communication infrastructure 107 serves as an interface between the data plane and control plane components of the GVRP application. Thus, the data plane component of the GVRP application is a distributed application that runs on each of the data plane cards 108 of the bridge 106. The data plane component of the GVRP application is responsible for functionality such as, for example, receiving and sending GVRP frames from and to the GIP context for a given VLAN, mapping the VLAN onto ports, and running the various states machines that the GVRP standard describes. The control plane component of the GVRP application is a centralized application running only on a VLAN management application portion 109 of a control plane card 110 of the bridge 106.

The control plane component of the GVRP application is responsible functionality such as, for example, interpreting GVRP management commands, reacting accordingly to such commands, maintaining a global view of all the VLANs created on the bridge, and registered such VLANs on each of the ports typically located on the data plane cards. One specific functional responsibility of the control plane component of the GVRP application is responsible for managing dynamic VLAN creation because this information needs to be made available to the user, upon management request, as well as to various applications that need to be aware of each newly created dynamic VLAN. Another specific functional responsibility of the control plane component of the GVRP application facilitating storage of runtime static configuration to be provided for via management input and runtime dynamic data (e.g., dynamic VLANs and port associations) that is created on the data plane cards 108 during GVRP frame processing.

Turning now to a detailed discussion of the present invention, a number of distinguishing functionalities are provided for by the present invention. The configuration and storage of the following parameters are allowed to be stored on a persistent database: a) a maximum number of VLANs that can be created on the bridge by GVRP; b) a maximum number of VLANs that can be mapped to all the ports of any data plane card on the bridge; c) a threshold to active alarm warning about maximum number of VLANs on the system about to be exceeded; d) threshold to deactivate alarm warning about maximum number of VLANs on the system having been exceeded after a level of VLANs dropping to or below the maximum level.

In one embodiment of the present invention, the persistent database is maintained on data storage of the GVRP control plane. The present invention provides for distribution of both static and dynamic configuration information to all of data plane cards of the bridge as well as to all other applications running on the same control plane card that are interested in information pertaining to VLANs or VLAN-Port associations. Each data plane card maintains a complete system view. Still further, the present invention provides for generation and clearing of an alarm indicating that the current number of VLANs created by GVRP is above or under a respective configured threshold. The function of analyzing a possible change of the alarm status is performed whenever a new dynamic VLAN is created upon request of GVRP or whenever a VLAN previously created by GVRP is deleted from the bridge.

One aspect of implementing the present invention is that Registrar, Applicant and Leave All state machines must operate without any additional delay relative to that defined in the related standards (e.g., with IEEE Std. 802.1Q, 2003 Edition, Virtual Bridged Local Area Networks). In other words, the data plane cards must not wait for any confirmation from the control plane card before running these state machines. For instance, the received GVRP frames must be propagated in the GIP context right away. This approach of immediate propagation allows a GVRP application to not have to wait for any dialog between the data plane and the control plane. The value-add of propagating the information right away is to refrain from impacting GVRP intrinsic convergence time. This is very important for ensuring fast convergence, for instance when a network establishes connectivity through GVRP on a back-up path, after a failure has happen somewhere on a prior active path.

Another aspect of implementing the present invention is that the decision to create or reject the creation of a new VLAN upon GVRP processing should be taken on the data plane card based on its current management configuration and state machine operation.

Still another aspect of implementing the present invention is that checking of a current number of VLANs created by GVRP and the maximum allowed limits configured shall be performed on the data plane card to avoid delay on running the state machines and to distribute the CPU load across all the data plane cards. Although there may always be a difference between the information on the control plane card and the data plane cards, performing this check on the data plane card is a reasonable and practical approach. This approach ensures protection against an attacker connected to ports of a single data plane card. In the unlikely event that there are multiple attackers connected to distinct data plane cards that are sending malicious data at the same time, this situation may result in creation of a few VLANs above the allowed threshold. This difference is due to the propagation time of internal control messages between the data plane cards and the control plane card, which is common and unavoidable on a distributed system.

Referring now to FIG. 2, an embodiment of a method for facilitating VLAN creation functionality in accordance with the present invention, which is referred to herein as the method 200. An operation 202 is performed for receiving a GVRP PDU frame on a data plane card application of a bridge (i.e., a Layer 2 device) and an operation 204 is performed for assessing advertised VLAN requirements. Such assessing advertised VLAN requirements includes parsing the GVRP PDU frame and processing all VLANs advertised on the frame for determining whether a dynamic VLAN advertised on the GVRP PDU frame requires creation of a new dynamic VLAN. In response to determining that a dynamic VLAN advertised on the GVRP PDU frame requires creation of a new dynamic VLAN, an operation 206 is performed for assessing the number of dynamic VLANs that are already present on the bridge. Such assessing the number of dynamic VLANs that are already present on the bridge includes determining whether a prescribed maximum number of dynamic VLANs permitted on the bridge will be exceeded by creation of the new dynamic VLAN. In response to determining that the prescribed maximum number of dynamic VLANs permitted on the bridge will not be exceeded by creation of the new dynamic VLAN, an operation 208 is performed for determining whether a prescribed maximum number of dynamic VLANs permitted on all ports of any data plane card of the bridge will be exceeded by creation of the new dynamic VLAN. In response to determining that creation of the new dynamic VLAN will not cause the maximum number of dynamic VLANs permitted on any data plane card of the bridge to be exceeded, an operation 210 is performed for creating the new dynamic VLAN, an operation 212 is performed for incrementing a counter that designates the number of VLANs created by GVRP on the bridge and an operation 214 is performed by the data plane card on which the new VLAN is created for issuing a VLAN creation notification corresponding to the newly created dynamic VLAN. After a control plane card of the bridge receives the VLAN creation notification, an operation 216 is performed by the control plane card of the bridge for updating an information repository (e.g., of the control plane card) with information corresponding to the new dynamic VLAN. Subsequently, the control plane card of the bridge performs an operation 218 for distributing information corresponding to the new dynamic VLAN to all other data plane cards of the bridge and to any other interested applications on the control plane card.

Turning now to a discussion of an embodiment of the VLAN creation functionality in accordance with the present invention from an application-specific standpoint, a maximum number of VLANs that can be created on the system by GVRP (i.e., gvrpMaxVlan) is configurable via management as a threshold value. In one embodiment, a bitmap (i.e., gvrpVlanBitmap) that represents a respective dynamic VLAN created by GVRP on the system is maintained on a control plane card of a bridge (i.e., a Layer 2 device). Correspondingly, a counter (i.e., gvrpCurrentVlanCounter) that holds the current number of dynamic VLANs created on the system by GVRP is also maintained on the control plane card along with the complete list of VLAN-Port associations on the system (gvrpVpa). It is disclosed herein that all data plane cards need to be aware of the complete VLAN-Port association list in order to determine when a VLAN is no longer associated to any port on the bridge. All of the abovementioned variables will be distributed to all the data plane cards whenever there is a change in their contents. In general, changes to the contents of these variables may be driven by both static configuration events on the control plane card as well as dynamic events resulting from GVRP processing on the data plane cards.

Upon reception of a GVRP frame advertising a given number of VLANs, a data plane card of the bridge runs the registrar and applicant state machines and performs all checks imposed by the configuration (e.g. restrict VLAN registration on ports). If a new dynamic VLAN is to be created based on the previous processing, the data plane card will verify whether the maximum number of VLANs on bridge has been reached (i.e., assessing the variable 'gvrpMaxVlan'). If gvrpMaxVlan has not yet been reached, the VLAN is created and configured on the data plane card, if needed (i.e. actual hardware configuration), and a message is sent to the control plane card (i.e., a VLAN creation notification message).

Upon reception of the VLAN Creation notification message on the control plane for notifying it of the creation of the new VLAN, the control plane card creates a context for this new VLAN and updates all corresponding control variables (e.g., gvrpVlanBitmap, gvrpCurrentVlanCounter and gvrpVpa). For any new VLAN created, the bit corresponding to this VLAN Identifier is set on the gvrpVlanBitmap bitmap. Once the control variables are updated, all the changes compared with the previous status (including the new gvrpCurrentVlanCounter value) are distributed to all the data plane cards on the bridge. The control plane card does not perform any checks against the configure threshold.

Whenever a VLAN previously created on the system based on GVRP demand is removed from the bridge, the bit corresponding to this VLAN Identifier is reset on the gvrpVlanBitmap bitmap, the gvrpCurrentVlanCounter counter and the VLAN Port associations list are updated accordingly. The changes are again distributed to all data plane cards. Duplicate requests to create dynamic VLANs coming from different data plane cards do not present an adverse situation. In this case, the only effect is the one of adding the ports from the distinct cards to the VLAN or association lists.

To reduce the overhead and save system resources, the VLAN creation notification messages and control variable changes are preferably, but not necessarily, packed in a single message based on the received GVRP frame and ranges may be specified rather than individual VLANs. In order to make the management system aware, an alarm gvrpMaxVlanAlarm may be defined. For example, if the total number of dynamic VLANs on the bridge reaches 95% of the maximum allowed (or another configurable value), the alarm is activated. If the total number of dynamic VLANs on the bridge drops below 80% of the maximum allowed (or another configurable value), the alarm is set and must be cleared.

In order to make the present invention even more robust and more reactive to dynamic configuration, the number of dynamic VLANs on a per data plane card (gvrpMaxVlanPerCard) can be limited. Such limitation insures some load-sharing for the creation and configuration of VLANs among the data plane cards. Furthermore, if this limitation only applies per system, the first data plane card to receive and process GVRP frames may claim all the VLANs defined by the limit gvrpMaxVlan, and the other data plane cards will have no possibility to add any. The present invention precludes such an adverse situation by providing a per data plane card threshold that defines the maximum number VLANs that can be created by GVRP onto any port of a data plane card at any given time. For the purpose of enforcing this per card threshold, a VLAN can be mapped onto several ports on the same data plane card and it is counted only once. It is important to understand that limiting threshold per port is not recommended because this configuration is usually already proposed by the various GVRP commands offered per standard (per port and per port per VLAN). Of course, a VLAN can only be mapped onto a port, by GVRP, if this VLAN already exists in the system (i.e. has been either created statically by the user before, or dynamically by GVRP) and, in that last case, the functionality limiting the number of dynamic VLANs discussed above has been successful for enabling creation of the new VLAN.

Referring now to instructions processible by a data processing device, it will be understood from the disclosures made herein that methods, processes and/or operations adapted for carrying out VLAN creation functionality as disclosed herein are tangibly embodied by computer readable medium having instructions thereon that are configured for carrying out such functionality. In one specific embodiment, the instructions are tangibly embodied for carrying out the method 200 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the presenting invention include a compact disk, a hard drive, RAM or other type of storage apparatus that has imaged thereon a computer program (i.e., instructions) adapted for carrying out VLAN creation functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A Layer 2 device configured for providing at least one of bridging and switching functionality in a local area network, comprising:
   computer-readable instructions contained in a memory and processed by a processor coupled to the memory for providing GVRP functionality;
   computer-readable instructions contained in the memory and processed by the processor for limiting the total number of dynamic VLANs that said GVRP functionality creates on a Layer 2 device of a local area network and on all ports of a data plane card of the Layer 2 device from all subscribers; and
   wherein said limiting the total number of dynamic VLANs includes:
   determining that a dynamic VLAN advertised on a GVRP PDU frame requires creation of a new dynamic VLAN;
   determining whether a total prescribed maximum number of dynamic VLANs permitted on the Layer 2 device from all subscribers will be exceeded by creation of the new dynamic VLAN by checking a database of a GVRP control plane within the Layer 2 device wherein the total prescribed maximum number of dynamic VLANs permitted on the Layer 2 device from all subscribers is established by one of a default setting and a user selected setting and precluding creation of the new dynamic VLAN at the Layer 2 device if creation of the new dynamic VLAN would cause the total prescribed maximum number of dynamic VLANs permitted on the Layer 2 device from all subscribers to be exceeded; and
   determining whether a total prescribed maximum number of dynamic VLANs permitted on all ports of any data plane card of the Layer 2 Device from all subscribers will be exceeded by creation of the new dynamic VLAN by checking the database of the GVRP control plane within the Layer 2 device wherein the total prescribed maximum number of dynamic VLANs permitted on all ports of any data plane card of the Layer 2 device from all subscribers is established by one of a default setting and a user selected setting and precluding creation of the new dynamic VLAN at the Layer 2 device if creation of the new dynamic VLAN would cause the total prescribed maximum number of dynamic VLANs permitted on all ports of any data plane card of the Layer 2 device from all subscribers to be exceeded.

2. The device of claim 1, further comprising:
   computer-readable instructions contained in the memory and processed by the processor for creating the new dynamic VLAN in response to determining that creation of the new dynamic VLAN will not cause the total prescribed maximum number of dynamic VLANs permitted on the Layer 2 device from all subscribers and on any data plane card of the Layer 2 device from all subscribers to be exceeded; and computer-readable instructions contained in the memory and processed by the processor for activating an alarm warning about maximum number of dynamic VLANs about to be exceeded when the number of dynamic VLANs reaches a threshold level and deactivating the alarm warning about maximum number of dynamic VLANs about to be exceeded when the number of dynamic VLANs falls beneath the threshold level.

3. The device of claim 2 wherein said providing GVRP functionality includes receiving the GVRP PDU frame on a data plane card application of the Layer 2 device.

4. The device of claim 2, further comprising:
computer-readable instructions contained in the memory and processed by the processor for incrementing a VLAN counter by a single counter unit in response to creating the new dynamic VLAN.

5. The device of claim 2, further comprising:
computer-readable instructions contained in the memory and processed by the processor for sending a VLAN creation notification to a control plane card of the Layer 2 device;
computer-readable instructions contained in the memory and processed by the processor for updating an information repository of the control plane card to reflect new information corresponding to the new dynamic VLAN; and
computer-readable instructions contained in the memory and processed by the processor for distributing at least a portion of said new information to at least one other data plane card of the Layer 2 device and to at least one requesting application of the control plane card.

6. The device of claim 5, further comprising:
computer-readable instructions contained in the memory and processed by the processor for incrementing a VLAN counter by a single counter unit in response to creating the new dynamic VLAN, wherein said providing GVRP functionality includes receiving the GVRP PDU frame on a data plane card application of the Layer 2 device.

7. A method, comprising:
receiving a GVRP PDU frame on a data plane card application of a Layer 2 device of a local area network;
determining that a dynamic VLAN advertised on the GVRP PDU frame requires creation of a new dynamic VLAN;
determining whether a total prescribed maximum number of dynamic VLANs permitted on the Layer 2 device of a local area network from all subscribers will be exceeded by creation of the new dynamic VLAN;
determining whether a total prescribed maximum number of dynamic VLANs permitted on all ports of any data plane card of the Layer 2 device from all subscribers will be exceeded by creation of the new dynamic VLAN;
creating the new dynamic VLAN in response to determining that creation of the new dynamic VLAN will not cause the total prescribed maximum number of dynamic VLANs permitted on the Layer 2 device from all subscribers to be exceeded and on any data plane card of the Layer 2 device from all subscribers to be exceeded; and
precluding creation of the new dynamic VLAN in response to determining that creation of the new dynamic VLAN will cause at least one of the total prescribed maximum number of dynamic VLANs permitted on the Layer 2 device to be exceeded and the total prescribed maximum number of dynamic VLANs on any data plane card to be exceeded.

8. The method of claim 7, further comprising:
incrementing a VLAN counter by a single counter unit in response to creating the new dynamic VLAN.

9. The method of claim 7, further comprising:
sending a VLAN creation notification to a control plane card of the Layer 2 device;
updating an information repository of the control plane card to reflect new information corresponding to the new dynamic VLAN; and
distributing at least a portion of said new information to at least one other data plane card of the Layer 2 device and to at least one requesting application of the control plane card.

10. A local area network including a Layer 2 device, the Layer 2 device comprising:
at least one data processing device;
instructions contained in a memory and processable by said at least one data processing device;
wherein said instructions are configured for enabling said at least one data processing device to facilitate:
providing GVRP functionality; and
limiting the total number of dynamic VLANs that said GVRP functionality creates on the Layer 2 device and on all ports of any data plane card of the Layer 2 device from all subscribers; and
wherein said limiting the total number of dynamic plans involves:
determining that a dynamic VLAN advertised on a GVRP PDU frame requires creation of a new dynamic VLAN;
determining whether a total prescribed maximum number of dynamic VLANs permitted on the Layer 2 device from all subscribers will be exceeded by creation of the new dynamic VLAN; and
determining whether a total prescribed maximum number of dynamic VLANs permitted on all ports of any data plane card of the network system from all subscribers will be exceeded by creation of the new dynamic VLAN.

11. The local area network of claim 10 wherein said instructions are configured for enabling said at least one data processing device to facilitate:
precluding creation of the new dynamic VLAN in response to determining that creation of the new dynamic VLAN will cause at least one of the total prescribed maximum number of dynamic VLANs permitted on the Layer 2 device from all subscribers to be exceeded and on any data plane card of the Layer 2 device from all subscribers to be exceeded: and
creating the new dynamic VLAN in response to determining that creation of the new dynamic VLAN will not cause the total prescribed maximum number of dynamic VLANs permitted on the Layer 2 device from all subscribers to be exceeded and on any data plane card of the Layer 2 device from all subscribers to be exceeded.

12. The local area network of claim 11 wherein said providing GVRP functionality includes receiving the GVRP PDU frame on a data plane card application of the Layer 2 device.

13. The local area network of claim 11 wherein said instructions are configured for enabling said at least one data processing device to facilitate:
incrementing a VLAN counter by a single counter unit in response to creating the new dynamic VLAN.

14. The local area network of claim 11 wherein said instructions are configured for enabling said at least one data processing device to facilitate:
- sending a VLAN creation notification to a control plane card of the Layer 2 device;
- updating an information repository of the control plane card to reflect new information corresponding to the new dynamic VLAN; and
- distributing at least a portion of said new information to at least one other data plane card of the Layer 2 device and to at least one requesting application of the control plane card.

15. The local area network of claim 14 wherein:
- said instructions are configured for enabling said at least one data processing device to facilitate incrementing a VLAN counter by a single counter unit in response to creating the new dynamic VLAN; and
- said providing GVRP functionality includes receiving the GVRP PDU frame on a data plane card application of the Layer 2 device.

* * * * *